(12) United States Patent
Yamazaki et al.

(10) Patent No.: US 11,034,834 B2
(45) Date of Patent: Jun. 15, 2021

(54) POLYCARBONATE RESIN COMPOSITION AND MOLDED ARTICLE OF SAME

(71) Applicant: IDEMITSU KOSAN CO., LTD., Tokyo (JP)

(72) Inventors: Yasunobu Yamazaki, Chiba (JP); Masami Takimoto, Sodegaura (JP); Tsuyoshi Murakami, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 15/576,371

(22) PCT Filed: May 26, 2016

(86) PCT No.: PCT/JP2016/065531
§ 371 (c)(1),
(2) Date: Nov. 22, 2017

(87) PCT Pub. No.: WO2016/194749
PCT Pub. Date: Dec. 8, 2016

(65) Prior Publication Data
US 2018/0187001 A1 Jul. 5, 2018

(30) Foreign Application Priority Data
May 29, 2015 (JP) .............................. JP2015-110310

(51) Int. Cl.
C08L 69/00 (2006.01)
C08L 71/02 (2006.01)
G02B 1/04 (2006.01)
G02B 1/14 (2015.01)

(52) U.S. Cl.
CPC ............... *C08L 69/00* (2013.01); *C08L 71/02* (2013.01); *G02B 1/045* (2013.01); *G02B 1/14* (2015.01); *C08L 2201/08* (2013.01); *C08L 2201/10* (2013.01)

(58) Field of Classification Search
CPC ........... C08L 69/00; C08L 71/02; G02B 1/00; G02B 1/045; G02B 1/14
See application file for complete search history.

(56) References Cited

U.S. PATENT DOCUMENTS

| | | | | |
|---|---|---|---|---|
| 5,502,153 | A * | 3/1996 | Sakashita | C08G 64/307 524/611 |
| 6,410,678 | B1 | 6/2002 | Ishida et al. | |
| 2009/0185363 | A1* | 7/2009 | Ishikawa | C08L 69/00 362/97.1 |
| 2012/0232243 | A1 | 9/2012 | Namiki et al. | |
| 2012/0309874 | A1 | 12/2012 | Takimoto et al. | |
| 2014/0364546 | A1 | 12/2014 | Okamoto et al. | |
| 2015/0247003 | A1 | 9/2015 | Bahn et al. | |
| 2016/0122533 | A1 | 5/2016 | Tomita et al. | |

FOREIGN PATENT DOCUMENTS

| | | |
|---|---|---|
| CN | 101432361 B | 7/2012 |
| CN | 102597057 A | 7/2012 |
| CN | 102686671 B | 4/2014 |
| EP | 1 149 852 A1 | 10/2001 |
| JP | H2175722 A | 7/1990 |
| JP | 2001-253943 | 9/2001 |
| JP | 2003-138120 | 5/2003 |
| JP | 2004-051700 | 2/2004 |
| JP | 2005-107380 | 4/2005 |
| JP | 2007-056314 A | 3/2007 |
| JP | 2013-231899 | 11/2013 |
| JP | 2014-080604 | 5/2014 |
| JP | 2015-025068 | 2/2015 |
| JP | 2015-048097 | 3/2015 |
| JP | 2015-066735 | 4/2015 |
| JP | 2015-093912 A | 5/2015 |
| JP | 2015-093914 | 5/2015 |
| JP | 2015-532333 | 11/2015 |
| WO | WO-00/46154 A | 8/2000 |
| WO | WO-2011/083635 | 7/2011 |
| WO | WO-2013/088796 | 6/2013 |
| WO | WO-2015/011994 A1 | 1/2015 |
| WO | WO-2015/030535 | 3/2015 |

OTHER PUBLICATIONS

Machine translation of JP 2003-138120 (Year: 2003).*
International Search Report issued in International Patent Application No. PCT/JP2016/065531 dated Jun. 21, 2016.
Supplementary European Search Report re Application No. 16803184.7; 6 pages, dated Nov. 29, 2018.
Japanese Third-Party Observation notification dispatched on Sep. 10, 2019 for corresponding Japan Application No. JP-2017-521866 with partial translations (2 pages).
Japanese Third-Party Observation dispatched on Sep. 10, 2019 for corresponding Japan Application No. JP-2017-521866 with partial translations (20 pages).
Publication 3—Nipon Oil Corporation Catalog (68 pages).
Taiwanese Office Action issued on Taiwanese Patent Application No. 105116725 dated Aug. 29, 2019.
CN Office Action issued in the corresponding Chinese Patent Application Ser. No. 201680030292.0, dated Jul. 2, 2019.
General Catalogues of Oily Products, NOF Corporation, 45-46 pages, Feb. 2019, URL, https://www.nof.co.jp/business/oleo/pdf/comprehensive.pdf (69 pages).

(Continued)

*Primary Examiner* — John E Uselding
(74) *Attorney, Agent, or Firm* — Foley & Lardner LLP

(57) ABSTRACT

Provided is a polycarbonate resin composition, including: an aromatic polycarbonate resin (A); and a polyether compound (B) having a polyoxyalkylene structure, in which: the polycarbonate resin composition includes 0.005 part by mass to 5 parts by mass of the polyether compound (B) with respect to 100 parts by mass of the aromatic polycarbonate resin (A); and the polycarbonate resin composition satisfies at least one of the following conditions (1) and (2): (1) an amount of potassium in the polyether compound (B) is 6 ppm by mass or less; and (2) an amount of sodium in the polyether compound (B) is 1 ppm by mass or less.

14 Claims, No Drawings

(56) References Cited

OTHER PUBLICATIONS

Japanese Office Action dated Sep. 24, 2019 for corresponding Application No. 2017521866 (11 pages).
European Patent Office Action dated Dec. 2, 2019 for corresponding Application No. 16803184.7.
NOF Corporation, "Comprehensive Catalogue", Oleo & Specialty Chemical Division, Mar. 24, 2017, Japan.
Third-party observation of corresponding European patent application No. 16803184.7 dated Jan. 27, 2020.
Office Action dated May 9, 2020 for corresponding Chinese Patent Application No. 201680030292.0.
Office Action dated Jul. 8, 2020 for corresponding European Patent Application No. 16803184.7.
Office Action dated Jun. 9, 2020 for corresponding Japanese Patent Application No. 2017-521866.
M. Shibata et al., "Alkylene oxide polymer—production method, properties and use—", Kaibundo publisher, pp. 8-19, Nov. 20, 1990, Japan.
Technical Bulletin for PolyTHF Polyether Polyol 1000, Mar. 1988, BASF Corporation.
Technical Bulletin for PolyTHF Polyether Polyol 2000, Mar. 1988, BASF Corporation.
Office Action dated Dec. 8, 2020 for corresponding Japanese Patent Application No. 2017-521866.

* cited by examiner

POLYCARBONATE RESIN COMPOSITION AND MOLDED ARTICLE OF SAME

RELATED APPLICATIONS

The present application claims priority under 35 USC 371 to International Patent Application number PCT/JP2016/065531, filed May 26, 2016, which claims priority to Japanese Patent Application No. 2015-110310, filed May 29, 2015. The contents of these applications are hereby incorporated by reference in their entireties.

TECHNICAL FIELD

The present invention relates to a polycarbonate resin composition and a molded article of the polycarbonate resin composition.

BACKGROUND ART

An aromatic polycarbonate is excellent in, for example, transparency, mechanical properties, thermal properties, electrical properties, and weatherability, and has been used in an optical molded article, such as a light-guiding plate, a lens, or an optical fiber, through the utilization of its characteristics. However, the light transmittance of the polycarbonate serving as one of the indicators representing its transparency is lower than that of, for example, a polymethyl methacrylate (PMMA). Therefore, a surface light source body including a light-guiding plate made of the aromatic polycarbonate and a light source has a problem in that its luminance is low. Accordingly, the development of a method of improving a luminance and a light transmittance in the light-guiding plate made of the aromatic polycarbonate has been progressing.

In PTLs 1 and 2, in order to provide a polycarbonate resin composition for a light-guiding plate that is free from becoming opaque and being reduced in transmittance, and that has a satisfactory transmittance and a satisfactory hue, there is a disclosure of an aromatic polycarbonate resin composition for a light-guiding plate obtained by incorporating, into an aromatic polycarbonate resin, a polyoxyalkylene glycol containing a polyethylene glycol or a polypropylene glycol as a main component, or a fatty acid ester thereof.

In addition, in PTL 3, in order to provide a polycarbonate resin composition for a light-guiding plate that is free from becoming opaque and being reduced in transmittance, and that has a satisfactory transmittance and a satisfactory hue, there is a disclosure of an aromatic polycarbonate resin composition for a light-guiding plate obtained by incorporating a polyoxyethylene glycol into an aromatic polycarbonate resin.

In addition, in PTL 4, there is a disclosure of an aromatic polycarbonate resin composition obtained by blending an aromatic polycarbonate resin with a polyoxytetramethylene-polyoxyethylene glycol.

However, a medium-sized light-guiding plate, such as a tablet, has been required to have a satisfactory hue, and the polycarbonate resin compositions disclosed in PTLs 1 to 4 cannot be said to suffice for the provision of such light-guiding plate in some cases.

CITATION LIST

Patent Literature

PTL 1: JP 2004-051700 A
PTL 2: JP 2013-231899 A
PTL 3: JP 2015-025068 A
PTL 4: WO 2011/083635 A1

SUMMARY OF INVENTION

Technical Problem

A problem to be solved by the present invention is to provide a polycarbonate resin composition enabling the production of a light-guiding plate or the like that is excellent in heat stability in high-temperature molding, and that is transparent and has a satisfactory hue even when molded in a wide temperature region.

Solution to Problem

The inventors of the present invention have made extensive investigations, and as a result, have found that a polycarbonate resin composition suitable for the production of a light-guiding plate or the like that is transparent and has a satisfactory hue can be obtained by reducing the amount of a specific alkali metal in a polyether compound (B) having a polyoxyalkylene structure in a resin composition.

That is, the present invention relates to the following polycarbonate resin composition.

<1> A polycarbonate resin composition, comprising:
an aromatic polycarbonate resin (A); and
a polyether compound (B) having a polyoxyalkylene structure,
wherein:
the polycarbonate resin composition comprises 0.005 part by mass to 5 parts by mass of the polyether compound (B) with respect to 100 parts by mass of the aromatic polycarbonate resin (A); and
the polycarbonate resin composition satisfies at least one of the following conditions (1) and (2):
(1) an amount of potassium in the polyether compound (B) is 6 ppm by mass or less; and
(2) an amount of sodium in the polyether compound (B) is 1 ppm by mass or less.
<2> The polycarbonate resin composition according to Item <1>, wherein the amount of potassium in the polyether compound (B) is 3 ppm by mass or less.
<3> The polycarbonate resin composition according to Item <1> or <2>, wherein the polycarbonate resin composition satisfies both the conditions (1) and (2).
<4> The polycarbonate resin composition according to any one of Items <1> to <3>, wherein the polyether compound (B) has a polyoxyalkylene structure represented by $(R^{B1}O)_m$ and a polyoxyalkylene structure represented by $(R^{B2}O)_n$, wherein $R^{B1}$ and $R^{B2}$ each independently represent an alkylene group having 1 or more carbon atoms, m represents 0 or more and less than 300, n represents 0 or more and less than 300, and m+n represents 5 or more and less than 300.
<5> The polycarbonate resin composition according to any one of Items <1> to <4>, further comprising 0.005 part by mass to 1 part by mass of an antioxidant (C) with respect to 100 parts by mass of the aromatic polycarbonate resin (A).
<6> The polycarbonate resin composition according to Item <5>, wherein the antioxidant (C) comprises a phosphorus-based compound having an aryl group.
<7> A molded article, comprising the polycarbonate resin composition of any one of Items <1> to <6>.
<8> An optical member, comprising the polycarbonate resin composition of any one of Items <1> to <6>.

Advantageous Effects of Invention

The polycarbonate resin composition of the present invention is excellent in heat stability in high-temperature molding. Accordingly, according to the polycarbonate resin composition of the present invention, the light-guiding plate or the like that is excellent in heat stability in high-temperature molding, and that is transparent and has a satisfactory hue even when molded in a wide temperature region can be produced.

DESCRIPTION OF EMBODIMENTS

The present invention is described below. In this description, the expression "A to B" concerning the description of a numerical value means "A or more and B or less" (when A<B) or "A or less and B or more" (when A>B). In addition, in the present invention, a combination of preferred modes is a more preferred mode.

A polycarbonate resin composition of the present invention has the following feature: a polycarbonate resin composition containing an aromatic polycarbonate resin (A) and a polyether compound (B) having a polyoxyalkylene structure, the polyether compound being reduced in content of potassium and/or sodium, in which the polycarbonate resin composition contains 0.005 part by mass to 5 parts by mass of the polyether compound (B) with respect to 100 parts by mass of the aromatic polycarbonate resin (A).

[Component (A): Aromatic Polycarbonate Resin]

A resin produced by a known method can be used as the aromatic polycarbonate resin (A) to be incorporated into the polycarbonate resin composition of the present invention without any particular limitation.

For example, a resin produced from a dihydric phenol and a carbonate precursor by a solution method (interfacial polycondensation method) or a melting method (ester exchange method), i.e., a resin produced by the interfacial polycondensation method involving causing the dihydric phenol and phosgene to react with each other in the presence of an end terminator, or by causing the dihydric phenol and diphenyl carbonate or the like to react with each other in the presence of the end terminator according to the ester exchange method or the like can be used.

Examples of the dihydric phenol can include various dihydric phenols, in particular, 2,2-bis(4-hydroxyphenyl) propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone. In addition, examples thereof can also include hydroquinone, resorcin, and catechol. One kind of those dihydric phenols may be used alone, or two or more kinds thereof may be used in combination. Among them, bis(hydroxyphenyl)alkane-based phenols are preferred, and bisphenol A is particularly suitable.

The carbonate precursor is, for example, a carbonyl halide, a carbonyl ester, or a haloformate, and is specifically phosgene, a dihaloformate of a dihydric phenol, diphenyl carbonate, dimethyl carbonate, diethyl carbonate, or the like.

The component (A) in the present invention may have a branched structure, and a branching agent may be, for example, 1,1,1-tris(4-hydroxyphenyl)ethane, α,α',α''-tris(4-hydroxyphenyl)-1,3,5-triisopropylbenzene, phloroglucin, trimellitic acid, or 1,3-bis(o-cresol).

A monovalent carboxylic acid or a derivative thereof or a monohydric phenol can be used as the end terminator. Examples thereof can include p-tert-butyl-phenol, p-phenylphenol, p-cumylphenol, p-perfluorononylphenol, p-(perfluorononylphenyl)phenol, p-(perfluorohexylphenyl)phenol, p-tert-perfluorobutylphenol, 1-(p-hydroxybenzyl)perfluorodecane, p-[2-(1H,1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, and 1,1,1,3,3,3-hexafluoro-2-propanol.

It is preferred that the aromatic polycarbonate resin (A) include a polycarbonate including, in a main chain thereof, a repeating unit represented by the following formula (I):

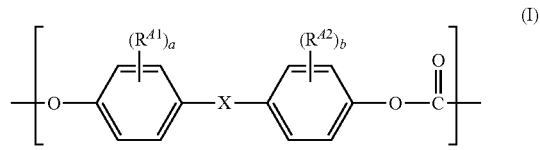

wherein $R^{41}$ and $R^{42}$ each independently represent an alkyl group or alkoxy group having 1 to 6 carbon atoms, and $R^{41}$ and $R^{42}$ may be identical to or different from each other, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of from 0 to 4, when a represents 2 or more, $R^{42}$'s may be identical to or different from each other, and when b represents 2 or more, $R^{42}$'s may be identical to or different from each other.

Examples of the alkyl group represented by each of $R^{41}$ and $R^{42}$ include a methyl group, an ethyl group, a n-propyl group, an isopropyl group, various butyl groups (the term "various" means that a linear group and various branched groups are included, and the same holds true for the following), various pentyl groups, and various hexyl groups. An example of the alkoxy group represented by each of $R^{41}$ and $R^{42}$ is an alkoxy group whose alkyl group moiety is the alkyl group described above.

$R^{41}$ and $R^{42}$ each preferably represent an alkyl group having 1 to 4 carbon atoms or an alkoxy group having 1 to 4 carbon atoms.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred.

a and b each independently represent an integer of from 0 to 4, preferably from 0 to 2, more preferably 0 or 1.

In the present invention, the aromatic polycarbonate resin (A) preferably contains a polycarbonate resin having a bisphenol A structure from the viewpoints of, for example, the transparency, mechanical characteristics, and thermal characteristics of a molded body to be obtained. The polycarbonate resin having a bisphenol A structure is specifically, for example, such a resin that X in the formula (I) represents an isopropylidene group. The content of the polycarbonate resin having a bisphenol A structure in the aromatic polycarbonate resin (A) is preferably from 50 mass % to 100 mass %, more preferably from 75 mass % to 100 mass %, still more preferably from 85 mass % to 100 mass %.

The viscosity-average molecular weight (Mv) of the aromatic polycarbonate resin (A) is preferably from 9,000 to 50,000, more preferably from 10,000 to 30,000, still more preferably from 11,000 to 25,000 from the viewpoint of the flowability. In particular, when the polycarbonate resin composition of the present invention is used as a thin-walled optical molded article, such as a light-guiding plate, the Mv of the aromatic polycarbonate resin (A) is preferably from 9,000 to 17,000.

In the present invention, the viscosity-average molecular weight (Mv) is calculated from the following equation after the determination of a limiting viscosity [η] through the measurement of the viscosity of a methylene chloride solution (concentration unit: g/L) at 20° C. with an Ubbelohde-type viscometer.

$$[\eta]=1.23\times10^{-5}Mv^{0.83}$$

In addition, it is more preferred that the amount of potassium in the polycarbonate resin be 1 ppm by mass or less, and the amount of sodium therein be 1 ppm by mass or less.

[Component (B): Polyether Compound Having Polyoxyalkylene Structure]

The polyether compound (B) having a polyoxyalkylene structure to be incorporated into the polycarbonate resin composition of the present invention needs to satisfy at least one of the following conditions (1) and (2):

(1) an amount of potassium in the polyether compound (B) is 6 ppm by mass or less; and (2) an amount of sodium in the polyether compound (B) is 1 ppm by mass or less.

In the present invention, potassium amounts and sodium amounts including those in the polyether compound (B) were determined by using plasma emission spectroscopy (ICP method).

In the condition (1), the amount of potassium in the polyether compound (B) is preferably 4 ppm by mass or less, more preferably 3 ppm by mass or less, still more preferably 1 ppm by mass or less, most preferably less than 1 ppm by mass.

In the condition (2), the amount of sodium in the polyether compound (B) is preferably less than 1 ppm by mass.

The inventors of the present invention have found that a polycarbonate resin composition enabling the production of a light-guiding plate or the like that is transparent and has a satisfactory hue even when molded in a wide temperature region can be obtained by using the polyether compound (B) having a polyoxyalkylene structure, the polyether compound being reduced in content of potassium or sodium. The polyether compound (B) more preferably satisfies both the conditions (1) and (2).

Meanwhile, it is difficult to set the content of potassium and/or sodium to 0 ppm through, for example, purification by an adsorption treatment, filtration separation, centrifugal separation, or the like. Accordingly, the polyether compound (B) of the present invention contains potassium and/or sodium. In consideration of such circumstances, in the present invention, the polyether compound (B) may contain potassium and/or sodium, but needs to satisfy the condition (1) and/or the condition (2).

The polyether compound (B) having a polyoxyalkylene structure preferably has a polyoxyalkylene structure represented by $(R^{B1}O)_m$ and a polyoxyalkylene structure represented by $(R^{B2}O)_n$. In the formulae, $R^{B1}$ and $R^{B2}$ each independently represent an alkylene group having 1 or more carbon atoms, m represents 0 or more and less than 300, n represents 0 or more and less than 300, and m+n represents 5 or more and less than 300, preferably from 10 to 200, more preferably from 20 to 100.

Examples of the alkylene group represented by each of $R^{B1}$ and $R^{B2}$ include a methylene group, an ethylene group, a trimethylene group, a propylene group, a tetramethylene group, and a hexamethylene group. Among them, an alkylene group having 1 to 5 carbon atoms is preferred.

In m $R^{B1}O$ groups, a plurality of $R^{B1}$'s, which may be identical to or different from each other, may represent alkylene groups identical to each other, or may represent alkylene groups different from each other in number of carbon atoms. That is, a polyoxyalkylene group represented by $(R^{B1}O)_m$ is not limited to a group having a single oxyalkylene unit as a repeating unit, such as a polyoxyethylene group or a polyoxypropylene group, and may be a group having a plurality of oxyalkylene units different from each other in number of carbon atoms, such as an oxyethylene unit and an oxypropylene unit, as repeating units.

In addition, the same description as that of $R^{B1}$ holds true for $R^{B2}$, and in n $R^{B2}O$ groups, a plurality of $R^{B2}$'s, which may be identical to or different from each other, may represent alkylene groups identical to each other, or may represent alkylene groups different from each other in number of carbon atoms.

The plurality of $R^{B1}$'s are more preferably identical to each other, and the plurality of $R^{B2}$'s are also more preferably identical to each other.

In addition, the polyether compound (B) is preferably at least one selected from the group consisting of a compound (B-1) represented by the following formula (II), an alkylene oxide adduct of a polyhydric alcohol and an ester thereof (B-2), and a cyclic polyether compound (B-3):

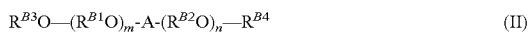

$$R^{B3}O\text{—}(R^{B1}O)_m\text{-A-}(R^{B2}O)_n\text{—}R^{B4} \qquad (II)$$

wherein $R^{B1}$ and $R^{B2}$ each independently represent an alkylene group having 1 or more carbon atoms, m represents 0 or more and less than 300, n represents 0 or more and less than 300, m+n represents 5 or more and less than 300, $R^{B3}$ and $R^{B4}$ each independently represent a hydrogen atom, a hydrocarbon group having 1 to 30 carbon atoms, an alkanoyl group having 1 to 30 carbon atoms, an alkenoyl group having 2 to 30 carbon atoms, or a glycidyl group, and A represents a single bond or a divalent organic group.

The alkylene group represented by each of $R^{B1}$ and $R^{B2}$ is as described above. The polyoxyalkylene structure represented by $(R^{B1}O)_m$ and the polyoxyalkylene structure represented by $(R^{B2}O)_n$ are also as described above.

Examples of the hydrocarbon group having 1 to 30 carbon atoms represented by each of $R^{B3}$ and $R^{B4}$ include an alkyl group having 1 to 30 carbon atoms, an alkenyl group having 2 to 30 carbon atoms, an aryl group having 6 to 30 carbon atoms, and an aralkyl group having 7 to 30 carbon atoms.

Each of the alkyl group and the alkenyl group may be linear, branched, or cyclic. Examples thereof include a methyl group, an ethyl group, a n-propyl group, an isopropyl group, various butyl groups, various pentyl groups, various hexyl groups, various octyl groups, a cyclopentyl group, a cyclohexyl group, an allyl group, a propenyl group, various butenyl groups, various hexenyl groups, various octenyl groups, a cyclopentenyl group, and a cyclohexenyl group.

Examples of the aryl group include a phenyl group, a tolyl group, and a xylyl group. Examples of the aralkyl group include a benzyl group, a phenethyl group, and a methylbenzyl group.

The alkanoyl group having 1 to 30 carbon atoms represented by each of $R^{B3}$ and $R^{B4}$ may be linear or branched, and examples thereof include a methanoyl group, an ethanoyl group, a n-propanoyl group, an isopropanoyl group, a n-butanoyl group, a t-butanoyl group, a n-hexanoyl group, a n-octanoyl group, a n-decanoyl group, a n-dodecanoyl group, and a benzoyl group. Among them, an alkanoyl group having 1 to 20 carbon atoms is preferred from the viewpoints of the compatibility, heat stability, and ease of production of the composition.

The alkenoyl group having 2 to 30 carbon atoms represented by each of $R^{B3}$ and $R^{B4}$ may be linear or branched, and examples thereof include an ethenoyl group, a n-propenoyl group, an isopropenoyl group, a n-butenoyl group, a t-butenoyl group, a n-hexenoyl group, a n-octenoyl group, a n-decenoyl group, and a n-dodecenoyl group. Among them, an alkenoyl group having 2 to 10 carbon atoms is preferred, and an alkenoyl group having 2 to 6 carbon atoms is more preferred from the viewpoint that the molecular weight of the composition is reduced, from the viewpoints of its compatibility and solubility, and from the viewpoint of its ease of production.

The divalent organic group represented by A is, for example, a group represented by the following formula (a):

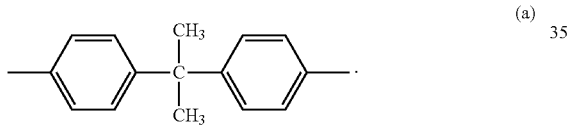

(a)

Specific examples of the compound (B-1) represented by the formula (II) include polyethylene glycol, polypropylene glycol, polytetramethylene glycol, polyoxytetramethylene-polyoxyethylene glycol, polyoxyethylene monomethyl ether, polyoxyethylene dimethyl ether, polyoxyethylene-bisphenol A ether, polyoxypropylene-bisphenol A ether, polyoxyethylene-polyoxypropylene-bisphenol A ether, polyethylene glycol-allyl ether, polyethylene glycol-diallyl ether, polypropylene glycol-allyl ether, polypropylene glycol-diallyl ether, polyethylene glycol-polypropylene glycol-allyl ether, polyethylene glycol dimethacrylate, polypropylene glycol dimethacrylate, and polypropylene glycol distearate. Those compounds are available as commercial products, and for example, "UNIOX (trademark)", "UNIOL (trademark)", "UNILUB (trademark)", "UNISAFE (trademark)", "POLYCERIN (trademark)", or "EPIOL (trademark)", which is manufactured by NOF Corporation, can be used.

In the alkylene oxide adduct of a polyhydric alcohol and the ester thereof (B-2), examples of the polyhydric alcohol include glycerin, diglyceryl ether, and sorbitol.

Specific examples of the cyclic polyether compound (B-3) include 18-crown-6 and dibenzo-18-crown-6.

The number-average molecular weight of the polyether compound (B) is not particularly limited, and is preferably from 200 to 10,000, more preferably from 500 to 8,000, still more preferably from 1,000 to 5,000.

The content of the polyether compound (B) with respect to the aromatic polycarbonate resin (A) of the present invention is from 0.005 part by mass to 5 parts by mass, preferably from 0.05 part by mass to 2 parts by mass, more preferably from 0.1 part by mass to 1 part by mass with respect to 100 parts by mass of the aromatic polycarbonate resin (A) from the viewpoint that a polycarbonate resin composition that is not reduced in optical characteristics by its deterioration at the time of its molding even when molded in a wide temperature region is obtained.

[Component (C): Antioxidant]

The polycarbonate resin composition of the present invention can contain an antioxidant (C) in addition to the components (A) and (B).

The antioxidant (C) is preferably a phosphorus-based compound having an aryl group, and the phosphorus-based compound more preferably has a phosphite structure. Among such compounds, at least one selected from the group consisting of a phosphorous acid ester (C-1) represented by the following formula (III-1) and a pentaerythritol diphosphite compound (C-2) represented by the following formula (IV) is preferred, and each of the phosphorous acid ester (C-1) and the pentaerythritol diphosphite compound (C-2) can impart heat resistance to the polycarbonate resin composition:

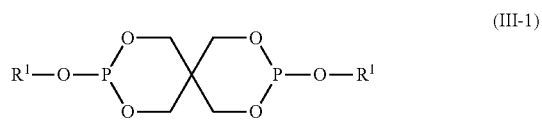

(III-1)

wherein $R^1$'s each represent an aryl group or an alkyl group, and may be identical to or different from each other;

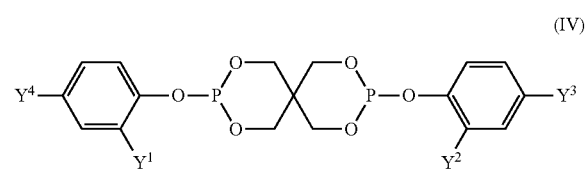

(IV)

wherein $Y^1$ to $Y^4$ each represent a hydrocarbon group having 6 to 15 carbon atoms, and may be identical to or different from each other, and $Y^1$ to $Y^4$ preferably each independently represent a cumyl group that may be unsubstituted or substituted, a phenyl group that may be unsubstituted or substituted, a naphthyl group that may be unsubstituted or substituted, or a biphenyl group that may be unsubstituted or substituted.

In the formula (III-1), the alkyl group represented by $R^1$ is preferably a linear or branched alkyl group having 1 to 10 carbon atoms. When $R^1$ represents an aryl group, $R^2$ preferably represents an aryl group represented by any one of the following formulae (III-a), (III-b), and (III-c):

(III-a)

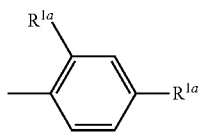

(III-b)

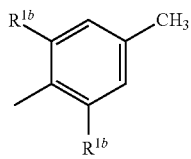

(III-c)

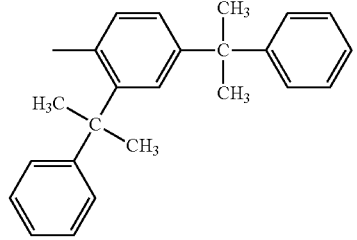

wherein, in the formula (III-a), $R^{1a}$'s each represent an alkyl group having 1 to 10 carbon atoms, and in the formula (III-b), $R^{1b}$'s each represent an alkyl group having 1 to 10 carbon atoms.

The phosphorous acid ester (C-1) is also preferably a compound represented by the following formula (III-2):

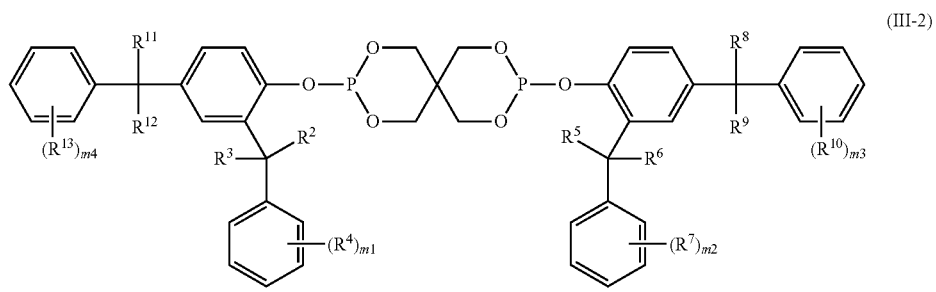

In the formula (III-2), $R^2$, $R^3$, $R^5$, $R^6$, $R^8$, $R^9$, $R^{11}$ and $R^{12}$ each independently represent a hydrogen atom or an alkyl group, $R^4$, $R^7$, $R^{10}$, and $R^{13}$ each independently represent an alkyl group, an aryl group, or an aralkyl group, and m1 to m4 each independently represent an integer of from 0 to 3, and $R^2$, $R^3$, $R^5$, $R^6$, $R^8$, $R^9$, $R^{11}$, and $R^{12}$ each preferably represent a methyl group, and m1 to m4 each preferably represent 0.

"ADK STAB PEP36" and "ADK STAB PEP-8" (each of which is manufactured by ADEKA Corporation, product names), and "Weston 618" and "Weston 619G" (each of which is manufactured by GE, product names), which are commercial products, can each be used as the phosphorous acid ester, but the phosphorous acid ester is not limited thereto.

The pentaerythritol diphosphite compound (C-2) is more preferably a pentaerythritol diphosphite compound represented by the following formula (IV-1):

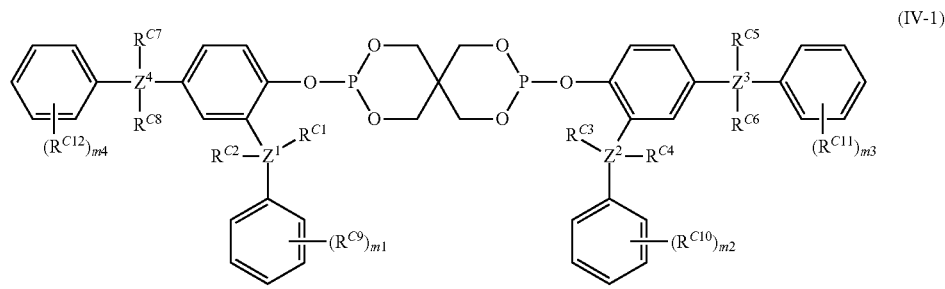

wherein $R^{C1}$ to $R^{C8}$ each independently represent an alkyl group or an alkenyl group, and $R^{C1}$ and $R^{C2}$, $R^{C3}$ and $R^{C4}$, $R^{C5}$ and $R^{C6}$, or $R^{C7}$ and $R^{C8}$ may be bonded to each other to form a ring, $R^{C9}$ to $R^{C12}$ each independently represent a hydrogen atom or an alkyl group, m1 to m4 each independently represent an integer of from 0 to 5, and $Z^1$ to $Z^4$ each independently represent a single bond or a carbon atom, and when $Z^1$ to $Z^4$ each represent a single bond, $R^{C1}$ to $R^{C8}$ are excluded from the formula (IV-1).

The pentaerythritol diphosphite compound (C-2) can be obtained by adding a chlorine-based solvent to phosphorus trichloride and pentaerythritol to provide pentaerythritol dichlorophosphite, and then heating and mixing the contents in the presence of an aromatic solvent and an organic nitrogen-containing basic compound (see, for example, JP 2004-018406 A).

Among the pentaerythritol diphosphite compounds (C-2), bis(2,4-dicumylphenyl)pentaerythritol diphosphite represented by the following formula (IV-2) is particularly suitable because the compound can satisfactorily impart heat resistance and hydrolysis resistance to the polycarbonate resin composition, and is easily available. The compound is available as a commercial product, and for example, "Doverphos (trademark) S-9228PC" manufactured by Dover Chemical Corporation can be used.

group, an aryloxy group, a polyoxyalkylene group, a carboxyl group, a silanol group, an amino group, a mercapto group, an epoxy group, and a vinyl group.

The polyorganosiloxane is more preferably a polyorganosiloxane in which the amount of potassium is 1 ppm by mass or less and the amount of sodium is 5 ppm by mass or less.

The addition amount of the polyorganosiloxane is preferably from 0.01 part by mass to 0.15 part by mass, more preferably from 0.02 part by mass to 0.15 part by mass, still more preferably from 0.05 part by mass to 0.1 part by mass with respect to 100 parts by mass of the aromatic polycarbonate resin (A). When the addition amount falls within the range, the polyorganosiloxane can concert with any other component to improve the releasability of the composition. Further, even under a molding condition at a high temperature of more than 340° C., in particular, a continuous molding condition, the occurrence of silver and the amount of a mold deposit can be significantly reduced.

The kinematic viscosity of the polyorganosiloxane at 25° C. is preferably 10 mm$^2$/s or more from the viewpoint of a lubricating effect serving as the releasability, and is preferably 200 mm$^2$/s or less from the viewpoint of its dispersibility in the polycarbonate resin. From the viewpoints, the viscosity of the polyorganosiloxane falls within the range of

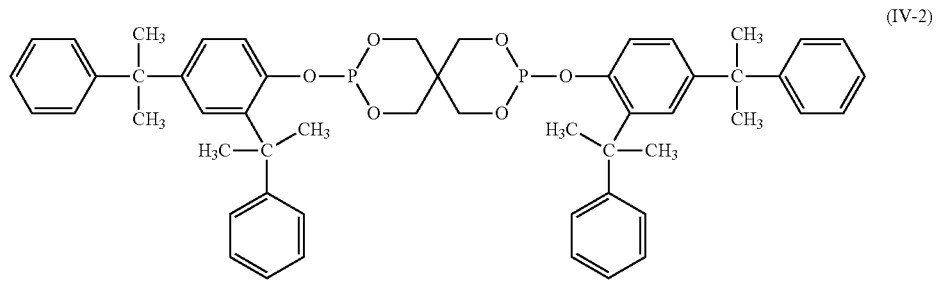 [SMILES: CC(C)(c1ccccc1)c1ccc(OP2OCC3(CO2)COP(Oc2ccc(C(C)(C)c4ccccc4)cc2C(C)(C)c2ccccc2)OC3)c(C(C)(C)c2ccccc2)c1]

(IV-2)

The content of the antioxidant (C) that may be contained in the aromatic polycarbonate resin composition of the present invention is preferably from 0.005 part by mass to 1 part by mass, more preferably from 0.01 part by mass to 0.8 part by mass, still more preferably from 0.03 part by mass to 0.5 part by mass with respect to 100 parts by mass of the aromatic polycarbonate resin (A) from the viewpoint that a polycarbonate resin composition that is not reduced in optical characteristics by its deterioration at the time of its molding even when molded in a wide temperature region is obtained. When one of the phosphorous acid ester (C-1) and the pentaerythritol diphosphite compound (C-2) is used as the antioxidant, the content of the antioxidant (C) is the amount of the phosphorous acid ester (C-1) or the pentaerythritol diphosphite compound (C-2) to be used, and when the phosphorous acid ester (C-1) and the pentaerythritol diphosphite compound (C-2) are used in combination, the amount of the antioxidant is the total amount of the compounds.

[Additive]

In addition to the components (A) to (C), any additive, such as a polyorganosiloxane, may be appropriately added to the polycarbonate resin composition of the present invention to the extent that the effects of the present invention are not inhibited. Examples thereof are shown below.

[Polyorganosiloxane]

The polyorganosiloxane is preferably a compound having one or more kinds of functional groups such as an alkoxy more preferably from 20 mm$^2$/s to 150 mm$^2$/s, still more preferably from 40 mm$^2$/s to 120 mm$^2$/s.

A difference between the refractive index of the polyorganosiloxane and the refractive index of a polycarbonate is preferably made as small as possible in order that the transparency of the polycarbonate may not be reduced upon addition of the polyorganosiloxane thereto. The refractive index of the polyorganosiloxane is preferably 1.45 or more, more preferably 1.50 or more, still more preferably 1.52 or more because the refractive index of the polycarbonate is 1.58.

[Aliphatic Cyclic Epoxy Compound]

The polycarbonate resin composition of the present invention may be blended with an aliphatic cyclic epoxy compound for further improving its hydrolysis resistance. The alicyclic epoxy compound refers to a cyclic aliphatic compound having an alicyclic epoxy group, i.e., an epoxy group obtained by adding one oxygen atom to an ethylene bond in an aliphatic ring, and is specifically disclosed in, for example, JP 11-158364 A. 3,4-Epoxycyclohexylmethyl-3',4'-epoxycyclohexane carboxylate ("CELLOXIDE 2021P" (trademark), manufactured by Daicel Corporation) and 1,2-epoxy-4-(2-oxiranyl)cyclohexane adduct of 2,2-bis(hydroxymethyl)-1-butanol ("EHPE3150" (trademark), manufactured by Daicel Corporation) can be used as commercial products of the alicyclic epoxy compound.

In addition, "EHPE3150CE" (trademark), which is commercially available from Daicel Corporation as a mixed product of "CELLOXIDE 2021P" and "EHPE3150", can be preferably used.

[Aromatic Polycarbonate Resin Composition and Optical Molded Article]

A method of producing the polycarbonate resin composition of the present invention is not particularly limited.

For example, the components (A) and (B), and as required, the component (C) and other additives are mixed, and the mixture is melted and kneaded. The melting and kneading can be performed by a typically used method, for example, a method using a ribbon blender, a Henschel mixer, a Banbury mixer, a drum tumbler, a single-screw extruder, a double-screw extruder, a co-kneader, a multiple-screw extruder, or the like. In normal cases, a heating temperature at the time of the melting and kneading is appropriately selected from the range of from about 220° C. to about 300° C.

It is preferred that the amount of potassium in the polycarbonate resin composition of the present invention be 1 ppm by mass or less, and the amount of sodium therein be 1 ppm by mass or less.

The molded article can be obtained by molding the polycarbonate resin composition of the present invention by using the melt-kneaded product or the resultant resin pellet as a raw material through the application of a known molding method, such as a hollow molding method, an injection molding method, an injection compression molding method, an extrusion molding method, a vacuum molding method, a blow molding method, a press molding method, an air-pressure molding method, an expansion molding method, a heat bending molding method, a compression molding method, a calender molding method, or a rotational molding method.

The polycarbonate resin composition of the present invention is suitable for a molding method requiring a molding material to have high flowability, such as the injection molding method, because the composition is excellent in heat resistance and hence can provide a molded article excellent in hue even in molding at a high temperature of more than 340° C. Meanwhile, in the extrusion molding method, a product having high optical characteristics, such as a sheet or a film, the product having high transparency and being free from yellowing, can be obtained by molding the composition at a low temperature of from about 220° C. to about 280° C.

The polycarbonate resin composition of the present invention is a resin composition excellent in light transmittance and luminance, and capable of resisting molding at high temperature, and is particularly suitable for injection molding. Meanwhile, the composition has high low-temperature molding suitability. Accordingly, the composition can provide a molded article excellent in light transmission property in molding except the injection molding as well, and is hence useful as an optical member, in particular, a light-guiding member.

The light-guiding plate is not particularly limited as long as the plate has a thin-walled portion having preferably a thickness of from several millimeters to several hundreds of micrometers, more preferably a thickness of 0.5 mm or less. The plate may be a flat plate or may be a curved plate or prism transfer plate having a lens effect. A molding method therefor is also not particularly limited, and the shape of, and the molding method for, the plate only need to be appropriately selected in accordance with purposes and applications.

A preferred method of producing the light-guiding plate is the same as the method of producing the molded body.

EXAMPLES

The present invention is described more specifically by way of Examples below, but the present invention is not limited to these Examples.

[Measurement of Viscosity-Average Molecular Weight (Mv)]

A viscosity-average molecular weight was calculated from the following equation after the determination of a limiting viscosity [η] through the measurement of the viscosity of a methylene chloride solution (concentration unit: g/L) at 20° C. with an Ubbelohde-type viscometer.

$$[\eta]=1.23\times10^{-5}M_v^{0.83}$$

[Measurement of Metal Amount]

Metal amounts in each component and a polycarbonate resin composition were measured by plasma emission spectroscopy (ICP method) as described below.

A sample was treated with sulfuric acid to be ashed, and was decomposed with an acid. After that, the metal amount measurement was performed with an ICP analyzer (manufactured by Agilent Technologies, "720-ES").

Components used in Examples and Comparative Examples are as described below.

<Aromatic Polycarbonate Resin (A)>

(A-1): "TARFLON FN1500" (manufactured by Idemitsu Kosan Co., Ltd., bisphenol A polycarbonate resin, viscosity-average molecular weight (Mv)=14,500)

(A-2): "TARFLON FN1200" (manufactured by Idemitsu Kosan Co., Ltd., bisphenol A polycarbonate resin, viscosity-average molecular weight (Mv)=11,500) <Polyether Compound (B) having Polyoxyalkylene Structure>

(B-1): "UNILUBE 50DE-25" (manufactured by NOF Corporation) was subjected to an adsorption treatment with an adsorbent "KYOWAAD 600" (manufactured by Kyowa Chemical Industry Co., Ltd.), and was subjected to filtration separation. Its potassium content and sodium content were less than 1 ppm by mass and less than 1 ppm by mass, respectively.

(B-2): "UNILUBE 50DE-25" (manufactured by NOF Corporation) was used. However, the adsorption treatment and the filtration separation treatment were not performed. Its potassium content and sodium content were 7 ppm by mass and 2 ppm by mass, respectively.

<Phosphorus-Based Compound (C)>

(C-1): "ADK STAB PEP-36" (manufactured by ADEKA Corporation, bis(2,6-di-tert-butyl-4-methylphenyl)pentaerythritol diphosphite)

(C-2): "Doverphos S-9228PC" (manufactured by Dover Chemical Corporation, bis(2,4-dicumylphenyl)pentaerythritol diphosphite)

<Other Additive>

"KR-511" (manufactured by Shin-Etsu Chemical Co., Ltd., polyorganosiloxane compound)

"CELLOXIDE 2021P" (manufactured by Daicel Corporation, 3,4-epoxycyclohexylmethyl-3',4'-epoxycyclohexanecarboxylate)

Examples 1 to 5 and Comparative Examples 1 to 5

In each example, a polycarbonate resin composition was prepared by blending respective components at amount ratios shown in Tables 1 and 2. The polycarbonate resin composition was melted and kneaded with a vented single screw extruder having a screw diameter of 40 mm ("VS-40" manufactured by Tanabe Plastics Machinery Co., Ltd.) at a cylinder temperature of 250° C., and the melt-kneaded product was subjected to strand cutting to manufacture a pellet. The manufactured pellet was dried at 110° C. for 5 hours, and was then molded into a flat plate-like test piece having a thickness of 5 mm with an injection molding machine ("ES-1000" manufactured by Nissei Plastic Industrial Co., Ltd.) at a cylinder temperature set to 320° C. for a cycle time of 50 seconds. The flat plate-like test piece thus molded was confirmed to be transparent by visual observation.

In addition, in order for the residence heat stability of each of the compositions to be confirmed, a pellet was produced in the same manner as that described above, and was dried at 110° C. for 5 hours. The pellet was molded into a flat plate-like test piece having a thickness of 3 mm with an injection molding machine ("ES-1000" manufactured by Nissei Plastic Industrial Co., Ltd.) at a cylinder temperature set to 350° C. for a cycle time of an interval of 5 minutes. A test piece molded first and a test piece molded 20 minutes after the molding of the first test piece were collected. The flat plate-like test pieces thus molded were confirmed to be transparent by visual observation.

The YI values of the test pieces obtained above were measured with a spectrophotometer ("U-4100" manufactured by Hitachi High-Technologies Corporation) under the conditions of a C light source and a two-degree field of view. The results are shown in Tables 1 and 2. Acceptance criteria are as follows: the YI of the test piece molded at 320° C. (320° C. molding YI) is 1.0 or less, and a difference "[YI 20 minutes after]-[initial YI]" (ΔYI) between the YI's of the test pieces molded at 350° C. (350° C. molding YI's) is less than 0.5.

The metal amounts of the used aromatic polycarbonate resins (A) are shown in Table 3, and the metal amounts of the antioxidants (C) and the other additives are shown in Table 4.

TABLE 1

| | | Example 1 | Example 2 | Example 3 | Example 4 | Example 5 |
|---|---|---|---|---|---|---|
| (A-1): FN1500 | | — | — | — | — | 100 |
| (A-2): FN1200 | | 100 | 100 | 100 | 100 | — |
| (B-1) | K amount: less than 1 ppm by mass Na amount: less than 1 ppm by mass | 0.8 | 0.8 | 0.8 | 0.8 | 0.6 |
| (C-1) | | — | — | — | 0.075 | — |
| (C-2) | | 0.075 | 0.075 | 0.10 | — | 0.075 |
| KR-511 | | 0.05 | 0.05 | 0.05 | 0.05 | 0.05 |
| CELLOXIDE 2021P | | 0.02 | 0.02 | 0.02 | 0.02 | 0.02 |
| YI at 320° C. (5-millimeter thick) | | 0.9 | 0.9 | 1.0 | 0.9 | 0.9 |
| YI at 350° C. residence (3-millimeter thick) | 0 minutes | 1.0 | 0.9 | 1.0 | 1.0 | 0.9 |
| | 20 minutes | 1.4 | 1.3 | 1.3 | 1.4 | 1.3 |
| | ΔYI | 0.4 | 0.4 | 0.3 | 0.4 | 0.4 |

TABLE 2

| | | Comparative Example 1 | Comparative Example 2 | Comparative Example 3 | Comparative Example 4 | Comparative Example 5 |
|---|---|---|---|---|---|---|
| (A-1): FN1500 | | — | — | — | — | 100 |
| (A-2): FN1200 | | 100 | 100 | 100 | 100 | — |
| (B-2) | K amount: less than 7 ppm by mass ppm Na amount: less than 2 ppm by mass ppm | 0.8 | 1.0 | 0.8 | 0.8 | 0.6 |
| (C-1) | | — | — | — | 0.075 | — |
| (C-2) | | 0.075 | 0.075 | 0.10 | — | 0.075 |
| KR-511 | | 0.05 | 0.05 | 0.05 | 0.05 | 0.05 |
| CELLOXIDE 2021P | | 0.02 | 0.02 | 0.02 | 0.02 | 0.02 |
| YI at 320° C. (5-millimeter thick) | | 1.0 | 0.9 | 1.0 | 1.0 | 1.0 |
| YI at 350° C. residence (3-millimeter thick) | 0 minutes | 1.0 | 1.0 | 1.0 | 1.0 | 1.0 |
| | 20 minutes | 1.9 | 2.0 | 1.7 | 1.7 | 1.5 |
| | ΔYI | 0.9 | 1.0 | 0.7 | 0.7 | 0.5 |

TABLE 3

|  | K | Na | Fe |
|---|---|---|---|
| (A-1): FN1500 | Less than 0.1 ppm by mass | Less than 0.1 ppm by mass | Less than 0.1 ppm by mass |
| (A-2): FN1200 | Less than 0.1 ppm by mass | Less than 0.1 ppm by mass | Less than 0.1 ppm by mass |

TABLE 4

|  | Na | Mg | Fe |
|---|---|---|---|
| (C-1) | Less than 1 ppm by mass | Less than 1 ppm by mass | Less than 1 ppm by mass |
| (C-2) | Less than 1 ppm by mass | Less than 1 ppm by mass | Less than 1 ppm by mass |
| KR-511 | 4 ppm by mass | | |
| CELLOXIDE 2021P | Less than 1 ppm by mass | Less than 1 ppm by mass | Less than 1 ppm by mass |

It is found that in each of Examples 1 to 5 using the polyether compound (B) whose potassium amount and sodium amount are each less than 1 ppm by mass, the YI of the test piece molded at 320° C. (320° C. molding YI) is 1.0 or less, and the ΔYI at the time of the molding at 350° C. is less than 0.5, and hence the composition can be molded in a wide temperature region without yellowing. In addition, in each of the examples, the YI of the test piece molded at 350° C. 20 minutes after the molding of the first test piece was 1.4 or less, and hence the composition was excellent in hue at the time of its high-temperature molding.

In contrast, in each of Comparative Examples 1 to 5 using the polyether compound (B) whose potassium amount and sodium amount deviate from the ranges of the present invention, in particular, the ΔYI value at the time of the molding at 350° C. exceeds the acceptance criterion "less than 0.5," and hence the composition is not excellent in hue at the time of its high-temperature molding.

INDUSTRIAL APPLICABILITY

The polycarbonate resin composition of the present invention is excellent in heat stability in high-temperature molding and can provide a molded article that is transparent and is not reduced in optical characteristics by its hue deterioration at the time of its molding even when molded in a wide temperature region. Accordingly, the composition is suitable for an optical product, such as a light-guiding plate, specifically a large-screen and thin display commodity, such as a smartphone or a tablet PC, and is also useful as an optical material for low-temperature molding.

The invention claimed is:

1. A polycarbonate resin composition, comprising:
an aromatic polycarbonate resin (A), wherein the aromatic polycarbonate resin (A) is a bisphenol A polycarbonate resin;
a polyether compound (B) having a polyoxyalkylene structure, wherein the polyether compound (B) is a compound represented by the formula (II):

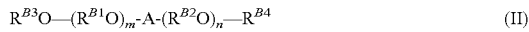

wherein $R^{B1}$ and $R^{B2}$ each independently represent an ethylene group or a propylene group, in $R^{B1}O$ groups, a plurality of $R^{B1}$'s are different from each other, in n $R^{B2}O$ groups, a plurality of $R_{B2}$'s are different from each other, m represents 0 or more and less than 300, n represents 0 or more and less than 300, m+n represents 5 or more and less than 300, $R^{B3}$ and $R^{B4}$ represent a hydrogen atom, and A represents a single bond or a divalent organic group;
an antioxidant (C), wherein the antioxidant is bis(2,4-dicumylphenyl)pentaerythritol diphosphite);
and
a polyorganosiloxane,
wherein:
the polycarbonate resin composition comprises 0.005 part by mass to 5 parts by mass of the polyether compound (B) with respect to 100 parts by mass of the aromatic polycarbonate resin (A);
the amount of the polyorganosiloxane is from 0.01 part by mass to 0.15 part by mass, with respect to 100 parts by mass of the aromatic polycarbonate resin (A); and
the polycarbonate resin composition satisfies at least one of the following conditions (1) and (2):
(1) an amount of potassium in the polyether compound (B) is 6 ppm by mass or less; and
(2) an amount of sodium in the polyether compound (B) is 1 ppm by mass or less.

2. The polycarbonate resin composition according to claim 1, wherein the amount of potassium in the polyether compound (B) is 3 ppm by mass or less.

3. The polycarbonate resin composition according to claim 1, wherein the polycarbonate resin composition satisfies both the conditions (1) and (2).

4. The polycarbonate resin composition according to claim 1, wherein the composition comprises 0.075 part by mass to 1 part by mass of the antioxidant (C) with respect to 100 parts by mass of the aromatic polycarbonate resin (A).

5. A molded article, comprising the polycarbonate resin composition of claim 1.

6. An optical member, comprising the polycarbonate resin composition of claim 1.

7. The polycarbonate resin composition according to claim 2, wherein the polycarbonate resin composition satisfies both the conditions (1) and (2).

8. The polycarbonate resin composition according to claim 3, wherein the composition comprises 0.075 part by mass to 1 part by mass of the antioxidant (C) with respect to 100 parts by mass of the aromatic polycarbonate resin (A).

9. The polycarbonate resin composition according to claim 1, wherein the polyorganosiloxane is a polyorganosiloxane in which the amount of potassium is 1 ppm by mass or less and the amount of sodium is 5 ppm by mass or less.

10. The polycarbonate resin composition according to claim 1, further comprising an aliphatic cyclic epoxy compound.

11. The polycarbonate resin composition according to claim 10, wherein the aliphatic cyclic epoxy compound is 3,4-epoxycyclohexylmethyl-3',4'-epoxycyclohexane carboxylate or 1,2-epoxy-4-(2-oxiranyl)cyclohexane adduct of 2,2-bis(hydroxymethyl)-1-butanol.

12. The polycarbonate resin composition according to claim 1, wherein the polyether compound (B) comprises UNILUBE 50DE-25.

13. The polycarbonate resin composition according to claim 10, wherein the aliphatic cyclic epoxy compound comprises 3,4-epoxycyclohexylmethyl-3',4'-epoxycyclohexanecarboxylate.

14. The polycarbonate resin composition according to claim 1, wherein the polyorganosiloxane is a compound having one or more kinds of functional groups selected from the group consisting of an alkoxy group, an aryloxy group, a polyoxyalkylene group, a carboxyl group, a silanol group, an amino group, a mercapto group, an epoxy group, and a vinyl group.

* * * * *

UNITED STATES PATENT AND TRADEMARK OFFICE
CERTIFICATE OF CORRECTION

PATENT NO. : 11,034,834 B2
APPLICATION NO. : 15/576371
DATED : June 15, 2021
INVENTOR(S) : Yasunobu Yamazaki et al.

It is certified that error appears in the above-identified patent and that said Letters Patent is hereby corrected as shown below:

In the Claims

Claim 1, Column 17, Lines 63-65:
Delete:
"an ethylene group or a propylene group, in m $R^{B1}O$ groups, a plurality of $R^{B1}$'s are different from each other, in n $R^{B2}O$ groups, a plurality of $R_{B2}$'s are different from"

Replace with:
an ethylene group or a propylene group, in m $R^{B1}O$ groups, a plurality of $R^{B1}$'s are different from each other, in n $R^{B2}O$ groups, a plurality of $R_{B2}$'s are different from Claim 11, Column 18, Lines 54-55:
Delete:
"3,4-epoxycyclohexylmethyl-3',4'-epoxycyclohexane carboxylate or 1,2-epoxy-4-(2-oxiranyl)cyclohexane adduct of"

Replace with:
3,4-epoxycyclohexylmethyl-3',4'-epoxycyclohexane carboxylate or 1,2-epoxy-4-(2-oxiranyl)cyclohexane adduct of Claim 13, Column 18, Lines 61-63:
Delete:
"claim 10, wherein the aliphatic cyclic epoxy compound comprises 3,4-epoxycyclohexylmethyl-3',4'-epoxycyclohexanecarboxylate"

Replace with:
claim 10, wherein the aliphatic cyclic epoxy compound comprises 3,4-epoxycyclohexylmethyl-3',4'-epoxycyclohexanecarboxylate Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*